(12) United States Patent
Miyamoto et al.

(10) Patent No.: US 10,230,442 B2
(45) Date of Patent: Mar. 12, 2019

(54) WIRELESS COMMUNICATION SYSTEM, CENTRAL UNIT EQUIPMENT, DISTRIBUTED UNIT EQUIPMENT, COMMUNICATION METHOD OF CENTRAL UNIT EQUIPMENT, AND COMMUNICATION METHOD OF DISTRIBUTED UNIT EQUIPMENT

(71) Applicant: NIPPON TELEGRAPH AND TELEPHONE CORPORATION, Tokyo (JP)

(72) Inventors: Kenji Miyamoto, Yokosuka (JP); Shigeru Kuwano, Yokosuka (JP); Jun Terada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/516,118

(22) PCT Filed: Apr. 11, 2016

(86) PCT No.: PCT/JP2016/061684
§ 371 (c)(1),
(2) Date: Mar. 31, 2017

(87) PCT Pub. No.: WO2017/179093
PCT Pub. Date: Oct. 19, 2017

(65) Prior Publication Data
US 2018/0234152 A1 Aug. 16, 2018

(51) Int. Cl.
*H04B 7/06* (2006.01)
*H04B 7/04* (2017.01)
*H04W 16/28* (2009.01)

(52) U.S. Cl.
CPC ............ *H04B 7/0626* (2013.01); *H04B 7/04* (2013.01); *H04B 7/0639* (2013.01); *H04W 16/28* (2013.01)

(58) Field of Classification Search
CPC .......................... H04B 7/0626; H04B 7/0639
See application file for complete search history.

(56) References Cited

U.S. PATENT DOCUMENTS

2013/0083681 A1* 4/2013 Ebrahimi Tazeh Mahalleh .......... H04L 5/0057 370/252
2015/0003350 A1* 1/2015 Yu ..................... H04W 72/1273 370/329
(Continued)

FOREIGN PATENT DOCUMENTS

JP 2014-230196 A 12/2014
JP 2016-082539 A 5/2016
(Continued)

OTHER PUBLICATIONS

"C-RAN, The Road Towards Green RAN", [online], Dec. 2013, China Mobile Research Institute, [retrieved on Oct. 1, 2014].
(Continued)

*Primary Examiner* — Fayyaz Alam
(74) *Attorney, Agent, or Firm* — Harness, Dickey & Pierce, P.L.C.

(57) ABSTRACT

In a partial centralization system configuration, a wireless communication system of the present invention transmits a precoding matrix generated in a media access control (MAC) function or a matrix or vector obtained by dividing the precoding matrix between central unit equipment and distributed unit equipment in addition to data of modulated
(Continued)

symbols necessary for a precoding matrix calculation and downlink control information (DCI) corresponding to the data.

11 Claims, 11 Drawing Sheets

(56) References Cited

U.S. PATENT DOCUMENTS

2016/0037511 A1* 2/2016 Vincze ................ H04B 7/024
    370/329
2018/0159602 A1* 6/2018 Tsai ................... H04B 7/0456

FOREIGN PATENT DOCUMENTS

JP  WO 2017179093 A1 * 10/2017 .............. H04B 7/04
WO  WO-2015/119031 A1  8/2015

OTHER PUBLICATIONS

"CPRI Specification V6.0", [online], Aug. 2013, CPRI, [retrieved on Oct. 1, 2014].

Hidekazu Taoka et al., "MIMO and inter-cell cooperative transmission and reception technology in LTE-Advanced", NTT Docomo Technical Journal, Vo. 18, No. 2, pp. 22-30, with partial translation.

Sangkyu Park et al,. Large-Scale Antenna Operation in Heterogeneous Cloud Radio Access Networks: A Partial Centralization Approach, IEEE Wireless Communications, Jun. 2015, vol. 22, Issue:3, pp. 32-40.

Kenji Miyamoto et al., Split-PHY Processing Architecture to Realize Base Station Coordination and Transmission Bandwidth Reduction in Mobile Fronthaul, Optical Fiber Communications Conference and Exhibition (OFC), Mar. 2015, pp. 1-3.

International Search Report for PCT/JP2016/061684, ISA/JP, dated Jun. 6, 2016, with English translation.

* cited by examiner

WIRELESS COMMUNICATION SYSTEM, CENTRAL UNIT EQUIPMENT, DISTRIBUTED UNIT EQUIPMENT, COMMUNICATION METHOD OF CENTRAL UNIT EQUIPMENT, AND COMMUNICATION METHOD OF DISTRIBUTED UNIT EQUIPMENT

CROSS-REFERENCE TO RELATED APPLICATIONS

This application is a 371 U.S. National Stage of International Application No. PCT/JP2016/061684, filed Apr. 11, 2016, which claims the benefit of and priority to Japanese Patent Application No. 2014-215268, filed Oct. 22, 2014. The entire disclosures of the above applications are incorporated herein by reference.

TECHNICAL FIELD

The present invention relates to distributed unit equipment in which a plurality of antenna units having some base station functions are physically extended and which is used as a distributed unit in a wireless communication system, central unit equipment which controls a plurality of distributed unit equipment, a wireless communication system including a plurality of distributed unit equipment and central unit equipment, a communication method of central unit equipment, and a communication method of distributed unit equipment.

BACKGROUND ART

A configuration in which a plurality of antenna units having some base station functions are physically extended and which is used as a distributed unit in a wireless communication system particularly, a mobile communication system, has been studied. Here, the antenna unit refers to a unit having a transmission interface, a wireless transceiver, and antennas. As a central unit, a base unit obtained by extending a distributed unit has a function of controlling a plurality of distributed units. In a communication scheme of performing communication between a central unit and a distributed unit, two system configurations called full centralization and partial centralization in which a function distribution between the central unit and the distributed unit is different are being studied.

As illustrated in FIG. 1, full centralization has a system configuration in which a central unit 81 has functions of a data link layer or higher and a physical layer from which antenna units are excluded and distributed units 82 having only an antenna unit are extended.

The other system is referred to as partial centralization which includes a system configuration in which functions of a data link layer or higher are installed in a central unit 91 and distributed units 92 having a physical layer function including an antenna unit are extended as illustrated in FIG. 2 (e.g., see Non-Patent Document 1).

While the physical layer is controlled within the central unit 81 in full centralization as illustrated in FIG. 1, the central unit 91 and the distributed unit 92 need to exchange control information of the physical layer in partial centralization as illustrated in FIG. 2. Currently, full centralization is a more widely used system configuration. In this configuration, a communication scheme using digital radio over fiber (RoF) technology represented by a common public radio interface (CPRI) (e.g., see Non-Patent Document 2) is used as a communication scheme between the central unit 81 and the distributed unit 82.

On the other hand, as illustrated in FIG. 3, one base station 94 connected to a core network 93 covers an area called a cell in a mobile communication system. In such a mobile communication system, a phenomenon in which a radio signal transmitted from a desired base station 94 and a radio signal transmitted from an adjacent base station interfere with each other when a terminal device 95 which is a mobile station, reaches an area of an edge of the cell and a transmission speed between the base station 94 and the terminal device 95 is remarkably degraded is problematic.

Coordinated multi-point transmission/reception (CoMP) technology (e.g., see Non-Patent Document 3) is being studied as a means for solving a problem of inter-cell signal interference. As illustrated in FIG. 3 and FIG. 4, in this CoMP technology, adjacent base stations 94 connected to the core network 93 (FIG. 3), the central unit 81 or 91 and the distributed units 82 or 92 connected to the core network 93, or the distributed units 82 or 92 (FIG. 4) communicate with each other in cooperation with the terminal device 95, which is a mobile station located at a cell edge. Also, there is joint transmission (JT) for transmitting signals from different base stations 94, the central unit 81 or 91, and the distributed unit 82 or 92, or the different distributed units 82 and 92 at the same time/frequency as one technique for implementing CoMP in downlink. In JT, a method of transmitting signals to be transmitted from different cells after a precoding process is performed in advance is called coherent JT.

DOCUMENT OF THE PRIOR ART

Non-Patent Document

[Non-Patent Document 1]"C-RAN The Road Towards Green RAN", [online], December 2013, China Mobile Research Institute, [Search on Oct. 1, 2014], Internet <http://labs.chinamobile.com/cran/wp-content/uploads/2014/06/20140613-C-RAN-WP-3.0. pH>

[Non-Patent Document 2]"CPRI Specification V6.0", [online], August 2013, CPRI, [Search on Oct. 1, 2014], Internet <http://www.cpri.info/downloads/CPRI_v_6_0_2013-08-30.pdf>

[Non-Patent Document 3] TAOKA Hidekazu and five others, "MIMO and inter-cell cooperative transmission and reception technology in LTE-Advanced", NTT DOCOMO Technical Journal, NIT DoCoMo, Inc., Vol. 18, No. 2, pp. 22-30

SUMMARY OF INVENTION

Problem to be Solved by the Invention

A flow of signal transmission in CoMP using coherent JT in a full centralization system configuration is illustrated in FIG. 5. In FIG. 5, the number of cooperating distributed units 82 is two and one antenna 21 is provided for each of two distributed units 82-1 and 82-2, but the number of cooperating distributed units 82 is not limited to two and a plurality of antennas may be provided in one distributed unit 82.

In a central unit 81 a media access control (MAC) function unit 11 of a data link layer determines downlink control information (DCI) indicating information such as a transport block size and/or a modulation/coding scheme in a physical layer on the basis of channel state information (CSI) feedback from an uplink signal, and generates predetermined transport blocks $d_1$ and $d_2$. The MAC function unit 11 inputs the transport blocks $d_1$ and $d_2$ to a modulator 12. Thereafter, the modulator 12 generates modulated symbols $s_1$ and $s_2$ to be transmitted from the transport blocks $d_1$ and $d_2$ to the distributed units 82-1 and 82-2. Here, physical layer processing such as cyclic redundancy check (CRC) assignment and coding performed before/after modulation is omitted.

Thereafter, a precoding matrix calculation unit 13 performs a precoding matrix calculation using the generated modulated symbols $s_1$ and $s_2$ and a precoding matrix W generated and reported by the MAC function unit 11. Precoded modulated symbols $s_{1p}$ and $s_{2p}$, which are outputs of the precoding matrix calculation unit 13, are represented by the following Equation (1).

$$\begin{bmatrix} s_{1p} \\ s_{2p} \end{bmatrix} = \begin{bmatrix} w_{11} & w_{12} \\ w_{21} & w_{22} \end{bmatrix} \begin{bmatrix} s_1 \\ s_2 \end{bmatrix} = \begin{bmatrix} w_{11}s_1 + w_{12}s_2 \\ w_{21}s_1 + w_{22}s_2 \end{bmatrix} \quad (1)$$

Here, $w_{ij}$ (i=1, 2 and j=1, 2) denotes each element of the precoding matrix.

The precoded modulated symbols $s_{1p}$ and $s_{2p}$ are converted by a signal conversion unit 14 for transmission to the distributed unit 82 and then transmitted to the distributed units 82-1 and 82-2. The distributed units 82-1 and 82-2 perform signal conversion on a signal received by a signal conversion unit 22. Next, digital-to-analog (D/A) conversion for returning a signal received by a D/A conversion unit 23 to an analog signal is performed. Thereafter, the analog signal converted by the D/A conversion unit 23 is transmitted as radio signals $s_{1AN}$ and $s_{2AN}$ from the antenna 21. Here, before signal conversion in the signal conversion unit 14 of the central unit 81, signal processing for performing multicarrier transmission such as orthogonal frequency division multiplexing (OFDM) may be performed on the precoded modulated symbols $s_{1p}$ and $s_{2p}$.

The same is true for transport blocks following the transport blocks $d_1$ and $d_2$ and modulated symbols corresponding thereto. However, because transmission of signals obtained by sampling and quantizing the precoded modulated symbols $s_{1p}$ and $s_{2p}$ is performed in the signal transmission in the full centralization system configuration, there is a problem in that a transmission capacity between the central unit 81 and the distributed unit 82 becomes very large. For example, if CPRI is used for signal transmission and if downlink communication is performed in a wireless section at a transmission speed of 75 Mbps, the necessary transmission speed between the central unit 81 and the distributed unit 82 is 1228 Mbps which is about 16 times greater than 75 Mbps.

On the other hand, in a partial centralization system configuration, it is possible to reduce a necessary transmission capacity between a central unit 91 and a distributed unit 92 in comparison to the centralization system configuration. FIG. 6 illustrates a signal transmission when CoMP using JT is performed in the partial centralization system configuration. Also, although the number of cooperating distributed units 92-1 and 92-2 is two in FIG. 6, the number need not be limited to 2, and the number of antennas 21 provided in one distributed unit 92-1 or 92-2 may be two or more.

In full centralization, modulation performed in the central unit 81 is performed in each of the distributed units 92-1 and 92-2 in FIG. 6. Also, here, as described in the full centralization, physical layer processing such as CRC assignment and coding performed before/after modulation is omitted. Unlike the case of full centralization, data to be transmitted between the central unit 91 and the distributed unit 92 includes data of the transport blocks $d_1$ and $d_2$ before the processing of the physical layer and DCI for controlling functions of the physical layer.

In the partial centralization system configuration, the data to be transmitted between the central unit 91 and the distributed unit 92 is not data of a signal obtained by sampling and quantizing a radio signal, but is the data of the transport blocks $d_1$ and $d_2$, and an increase in transmission capacity due to DCI is negligibly small with respect to an effect of reducing the transmission capacity. Therefore, the transmission capacity of data to be transmitted between the central unit 91 and the distributed unit 92 is significantly smaller than in the case of full centralization. However, because the functions of the physical layer are distributed in the partial centralization, there is a problem in that a precoding matrix calculation to be performed using both of the modulated symbols $s_1$ and $s_2$ is impossible.

In order to solve the above-described problem, an objective of the present invention is to provide a wireless communication system, central unit equipment, distributed unit equipment, a communication method of central unit equipment, and a communication method of distributed unit equipment capable of performing a precoding matrix calculation even when functions of a physical layer are distributed in a partial centralization system configuration.

Means for Solving the Problems

In order to achieve the aforementioned objective, in the present invention, a precoding matrix calculation is performed even when functions of a physical layer are distributed by transmitting a precoding matrix generated in a MAC function or a matrix or a vector obtained by dividing the precoding matrix between central unit equipment and distributed unit equipment in addition to data of modulated symbols necessary for the precoding matrix calculation and DCI corresponding to the data in a partial centralization system configuration.

Specifically, central unit equipment of the present invention is central unit equipment for controlling distributed unit equipment each including antennas for performing wireless communication of a data signal with a mobile terminal device, the central unit equipment including: a transmission unit configured to transmit a data signal in which the number of blocks is less than or equal to the total number of antennas provided in all of the distributed unit equipment serving as control targets of the central unit equipment, control information for performing wireless communication of the data signal with the mobile terminal device, and a necessary matrix for a calculation in which a specific data signal to be transmitted to the mobile terminal device is generated from a data signal received from the central unit equipment by the distributed unit equipment, to all the distributed unit equipment serving as the control targets of the central unit equipment.

In the central unit equipment of the present invention, the transmission unit may transmit a partial matrix or a partial vector, which is obtained by dividing a necessary element for a calculation in which the specific data signal to be transmitted to the mobile terminal device by the distributed unit equipment of a transmission destination is generated for each distributed unit equipment of the transmission destination among necessary elements for a calculation in which the specific data signal to be transmitted to the mobile terminal device by all of the distributed unit equipment serving as control targets included in the matrix is generated, to the distributed unit equipment of the transmission destination.

Specifically, a distributed unit equipment of the present invention is distributed unit equipment for performing wireless communication of a data signal with a mobile terminal device according to control information transmitted from central unit equipment which controls distributed unit equipment each including antennas for performing the wireless communication of the data signal with the mobile terminal device, the distributed unit equipment including: a reception unit configured to receive the data signal in which the number of blocks is less than or equal to the total number of antennas provided in all of the distributed unit equipment serving as control targets of the central unit equipment, control information for performing wireless communication of the data signal with each mobile terminal device, and a necessary matrix for a calculation in which a specific data signal to be transmitted to the mobile terminal device is generated from the data signal received from the central unit equipment to be performed by the distributed unit equipment, from the central unit equipment; a modulator configured to modulate each data signal received by the reception unit and generate a modulated symbol of the each data signals; and a calculation unit configured to perform a matrix calculation using the modulated symbol and the matrix received by the reception unit and generate the specific data signal to be transmitted to the mobile terminal device.

The distributed unit equipment of the present invention may further include: a buffer configured to accumulate the data signal received by the reception unit, wherein the modulator sequentially reads data signals accumulated by the buffer from the buffer, modulates the read data signals, and sequentially generates modulated symbols of the data signals.

In the distributed unit equipment of the present invention, the reception unit may receive a partial matrix or a partial vector, which is obtained by dividing a necessary element for a calculation in which the specific data signal to be transmitted to the mobile terminal device by the distributed unit equipment that receives the matrix is generated for each distributed unit equipment that receives the matrix among necessary elements for a calculation in which the specific data signal to be transmitted to the mobile terminal device by all of the distributed unit equipment serving as control targets included in the matrix is generated; and the calculation unit may perform the matrix calculation using the modulated symbols and the elements of the matrix received from the central unit equipment.

Specifically, a wireless communication system of the present invention includes: the above-described central unit equipment; and the above-described distributed unit equipment.

Specifically, a communication method of central unit equipment according to the present invention is a communication method of central unit equipment for controlling distributed unit equipment each including antennas for performing wireless communication of a data signal with a mobile terminal device, the communication method including: a central unit transmission procedure of transmitting a data signal in which the number of blocks is less than or equal to the total number of antennas provided in all of the distributed unit equipment serving as control targets of the central unit equipment, control information for performing wireless communication of the data signal with each mobile terminal device, and a necessary matrix for a calculation in which a specific data signal to be transmitted to the mobile terminal device is generated from a data signal received from the central unit equipment by the distributed unit equipment, to all of the distributed unit equipment serving as the control targets of the central unit equipment.

In the communication method of the central unit equipment according to the present invention, a partial matrix or a partial vector, which is obtained by dividing a necessary element for a calculation in which the specific data signal to be transmitted to the mobile terminal device by the distributed unit equipment of a transmission destination is generated for each distributed unit equipment of the transmission destination among necessary elements for a calculation in which the specific data signal to be transmitted to the mobile terminal device by all of the distributed unit equipment serving as control targets included in the matrix is generated, may be transmitted to the distributed unit equipment of the transmission destination in the central unit transmission procedure.

Specifically, a communication method of distributed unit equipment of the present invention is a communication method of distributed unit equipment for performing wireless communication of a data signal with a mobile terminal device according to control information transmitted from central unit equipment which controls distributed unit equipment each including antennas for performing the wireless communication of the data signal with the mobile terminal device, the communication method including: a reception procedure of receiving a data signal in which the number of blocks is less than or equal to the total number of antennas provided in all of the distributed unit equipment serving as control targets of the central unit equipment, control information for performing wireless communication of the data signal with each mobile terminal device, and a necessary matrix for a calculation in which a specific data signal to be transmitted to the mobile terminal device is generated from the data signal received from the central unit equipment to be performed by the distributed unit equipment, from the central unit equipment; a modulation procedure of modulating each data signal received from the central unit equipment and generating a modulated symbol of each of the data signals; a calculation procedure of performing a matrix calculation using the modulated symbol and the matrix received from the central unit equipment and generating a specific data signal after the calculation; and a distributed unit transmission procedure of transmitting the specific data signal extracted in the calculation procedure to the mobile terminal device.

In the communication method of the distributed unit equipment of the present invention, the data signal received from the central unit equipment may be accumulated in a buffer in the reception procedure, and, in the modulation procedure, data signals accumulated in the buffer may be sequentially read from the buffer and modulated, and modulated symbols of the data signals may be sequentially generated.

In the communication method of the distributed unit equipment of the present invention, a reception unit may receive a partial matrix or a partial vector, which is obtained by dividing a necessary element for a calculation in which the specific data signal to be transmitted to the mobile terminal device by the distributed unit equipment that receives the matrix is generated for each distributed unit equipment that receives the matrix among necessary elements for a calculation in which the specific data signal to be transmitted to the mobile terminal device by all of the distributed unit equipment serving as control targets included in the matrix is generated, in the reception procedure, and the matrix calculation may be performed using the modulated symbols and the elements of the matrix received from the central unit equipment in the calculation procedure.

Also, the above-described inventions can be combined as much as possible.

Advantageous Effects of Invention

According to the present invention, it is possible to provide a wireless communication system, central unit equipment, distributed unit equipment, a communication method of central unit equipment, and a communication method of distributed unit equipment capable of performing a precoding matrix calculation even when functions of a physical layer are distributed in a partial centralization system configuration.

EMBODIMENTS FOR CARRYING OUT THE INVENTION

Figure 1:
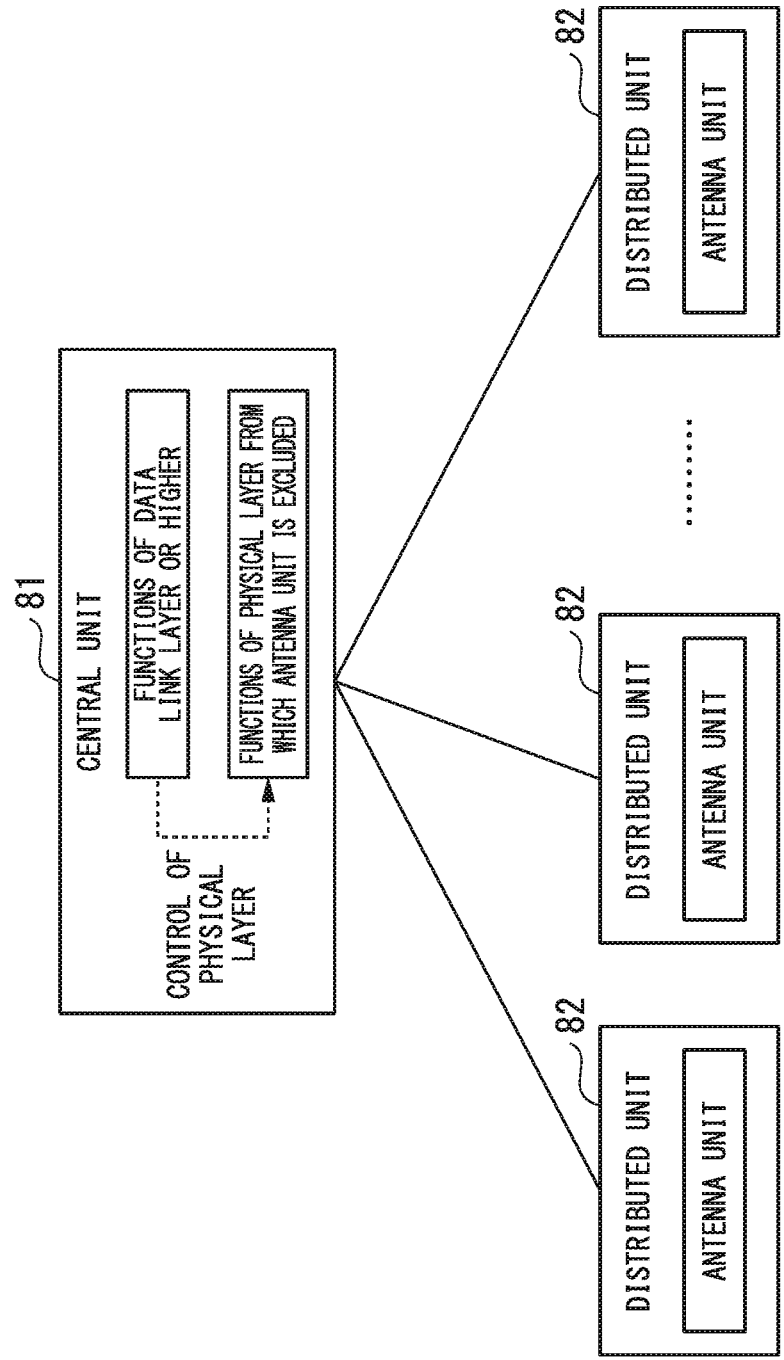
FIG. 1 is a block diagram illustrating an example of a full centralization system configuration in a conventional technology.
Figure 2:
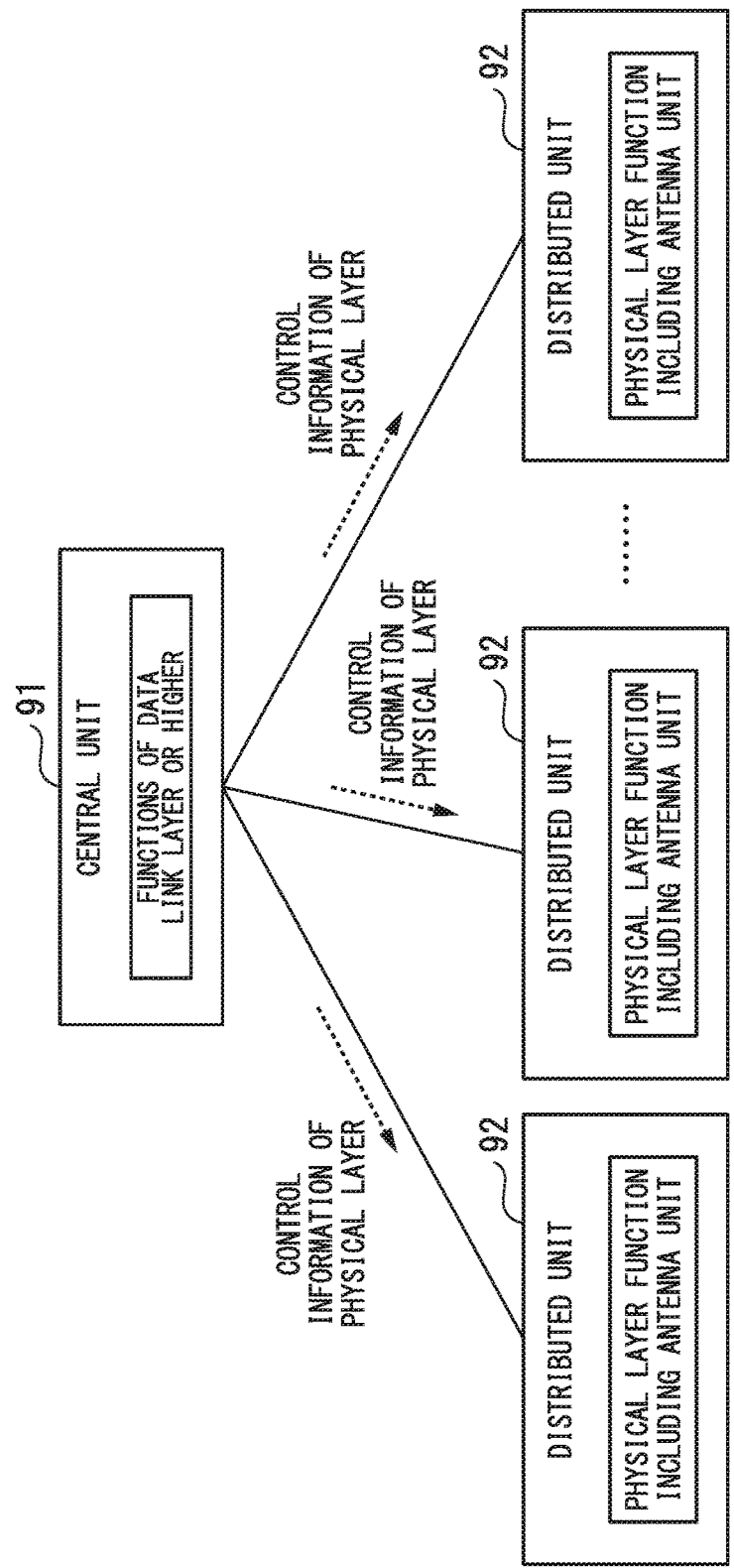
FIG. 2 is a block diagram illustrating an example of a partial configuration system configuration in the conventional technology.
Figure 3:
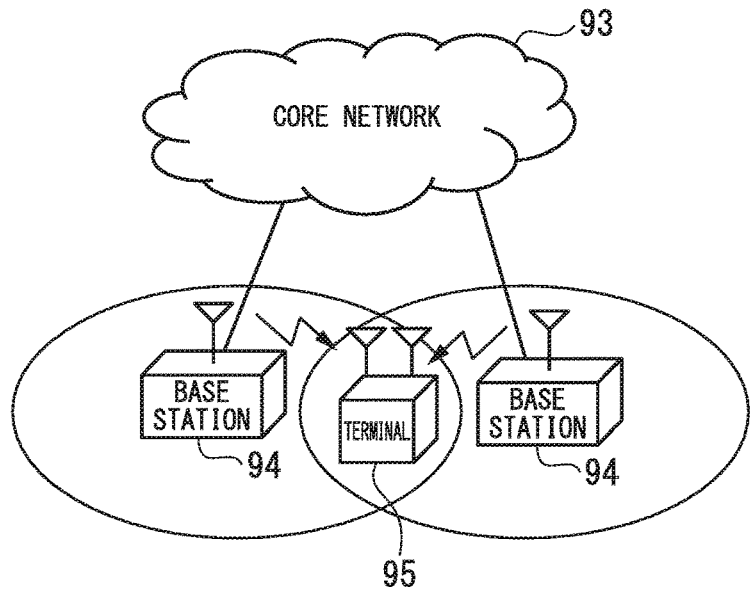
FIG. 3 is a diagram illustrating a CoMP process by two base stations in the conventional technology.
Figure 4:
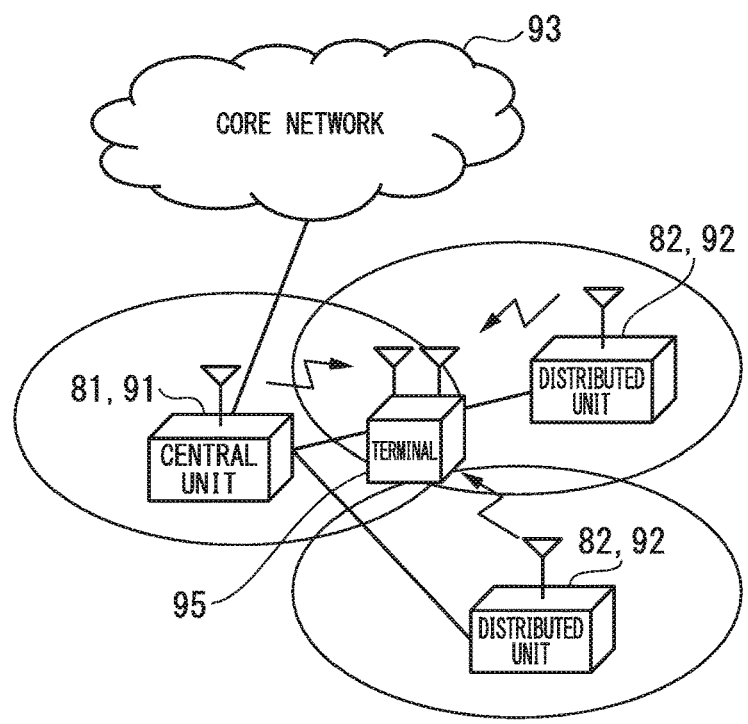
FIG. 4 is a diagram illustrating a CoMP process by a central unit and distributed units in the conventional technology.

Hereinafter, embodiments of the present invention will be described in detail with reference to the drawings, it should be understood that the present invention is not limited to the embodiments shown in the drawings. These embodiments are only examples and various changes, modifications, and improvements can be made to the embodiments on the basis of knowledge of those skilled in the art. Also, in the present description and the drawings, the same components are assumed to be denoted by the same reference numerals.

Embodiment 1

Figure 7:
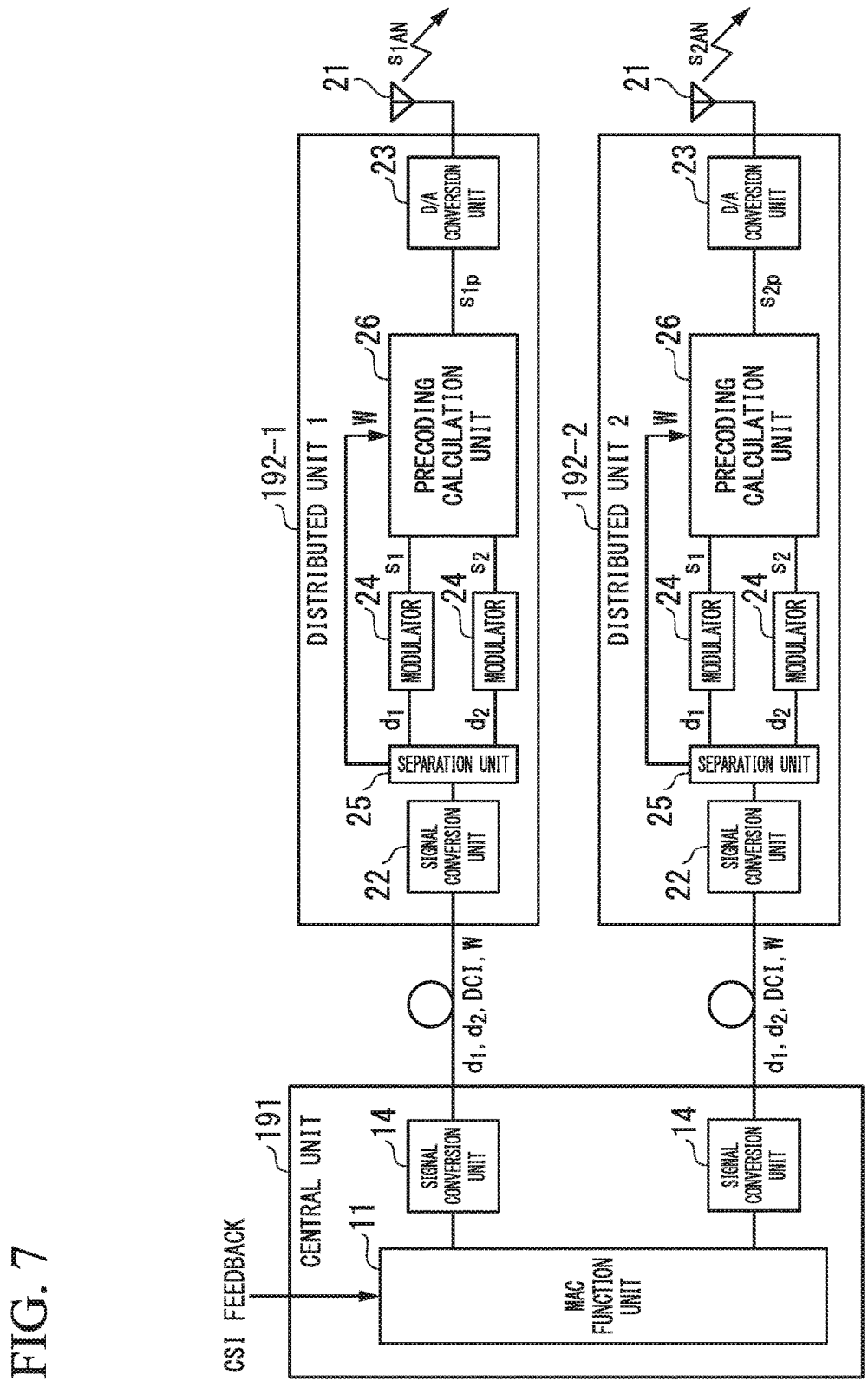
FIG. 7 is a block diagram illustrating a wireless communication system according to Embodiment 1 of the present invention.

FIG. 7 illustrates an example of a wireless communication system according to Embodiment 1. The wireless communication system according to the present embodiment is a system using a partial centralization system configuration and performs signal transmission of CoMP in partial centralization.

This system includes a central unit 191 which functions as central unit equipment and distributed units 192-1 and 192-2 which function as distributed unit equipment. In the present embodiment, the number of distributed units 192 cooperating with the central unit 191 is two and the number of antennas 21 provided in each of the distributed units 192-1 and 192-2 is one. The central unit 191 transmits different signal data to each of the distributed units 192-1 and 192-2. However, the number of distributed units 192 cooperating with the central unit 191 is not limited to two and the number of antennas 21 provided in one distributed unit 192 may be two or more. In embodiments illustrated in FIG. 7 and the subsequent drawings, an arrow indicating control of a physical layer by DCI is omitted.

The central unit 191 includes a MAC function unit 11 and a signal conversion sit 14. The signal conversion unit 14 functions as a transmission unit and is provided for each of the distributed units 192-1 and 192-2 connected to the central unit 191.

Each of the distributed units 192-1 and 192-2 include the antenna 21, a signal conversion unit 22 functioning as a reception unit, a separation unit 25, a modulator 24, a precoding calculation unit 26 functioning as a calculation unit, and a D/A conversion unit 23.

The central unit 191 executes a communication method of the central unit equipment according to the present embodiment. The communication method of the central unit equipment according to the present embodiment is a communication method of the central unit 191 that controls one or more distributed units 192 each having one or more antennas to perform wireless communication of a data signal with a terminal device 95, which is a mobile terminal device, and has a central unit transmission procedure.

In the central unit transmission procedure, the signal conversion unit 14 of the central unit 191 transmits data signals and control information corresponding to modulated symbols $s_1$ and $s_2$ to each distributed unit 192. The data signals are, for example, both transport blocks $d_1$ and $d_2$. The control information is, for example, DCI corresponding to both of the transport blocks $d_1$ and $d_2$. Here, the data signal has the number of blocks equal to or less than the total number of the antennas 21 provided in all the distributed units 192 serving as control targets of the central unit 191. In the present embodiment, because the number of antennas 21 is two, the signal conversion unit 14 transmits the transport blocks $d_1$ and $d_2$ as two block data signals.

Furthermore, in the central unit transmission procedure, the signal conversion unit 14 of the central unit 191 also transmits a precoding matrix W represented by the following Equation (2) generated by the MAC function unit 11 to all of the distributed units 192, which are the control targets of the central unit 191. The precoding matrix W functions as a necessary matrix for a calculation performed in the distributed unit 192 and is used in a calculation for generating a specific data signal to be transmitted from the transport blocks $d_1$ and $d_2$ received from the central unit 191 by the distributed unit 192 to the mobile terminal device 95. Transmission of the preceding matrix W is performed by quantizing each element $w_{ij}$ and transmitting the quantized element $w_{ij}$ from the signal conversion unit 14.

$$W = \begin{bmatrix} w_{11} & w_{12} \\ w_{21} & w_{22} \end{bmatrix} \quad (2)$$

The distributed units 192-1 and 192-2 execute the communication method of the distributed unit equipment according to the present embodiment. The communication method of the distributed unit equipment according to the present embodiment is a communication method of the distributed unit equipment that performs wireless communication of a data signal with the terminal device 95 according to control information transmitted from the central unit 191 that controls one or more distributed units 192, which each include one or more antennas 21 for performing wireless communication of a data signal with the terminal device 95, and sequentially includes a reception procedure, a modulation procedure, a calculation procedure, and a distributed unit transmission procedure.

In the reception procedure, the signal conversion units 22 of the distributed units 192-1 and 192-2 receive the transport blocks $d_1$ and $d_2$, DCI, and the precoding matrix W from the central unit 191. Also, in the reception procedure, each of the distributed units 192-1 and 192-2 separate $d_1$, and $d_2$, and the precoding matrix W in the separation unit 25.

In the modulation procedure, the modulators 24 of the distributed stations 192-1 and 192-2 perform modulation on each of the transport blocks $d_1$ and $d_2$ to obtain the modulated symbols $s_1$ and $s_2$. Physical layer processing such as CRC assignment and coding may be performed before/after modulation by the modulator 24.

In the calculation procedure, the precoding calculation units 26 of the distributed units 192-1 and 192-2 perform a precoding matrix calculation represented by Equation (1) using the modulated symbols $s_1$ and $s_2$ and the precoding matrix W. Then, the precoding calculation unit 26 of the distributed unit 192-1 causes the calculated modulated symbol $s_{1p}$ to remain and discards $s_{2p}$, whereas the precoding calculation unit 26 of the distributed unit 192-2 causes the calculated modulated symbol $s_{2p}$ to remain and discards $s_{1p}$. The calculated modulated symbols $s_{1p}$ and $s_{2p}$ function as specific data signals to be transmitted to the mobile terminal device 95 by the distributed units 192-1 and 192-2.

In the distributed unit transmission procedure, the D/A conversion units 23 of the distributed units 192-1 and 192-2 perform D/A conversion on the modulated symbols $s_{1p}$ and $s_{2p}$ and transmit analog signals $s_{1AN}$ and $s_{2AN}$ from the antennas 21 to the mobile terminal device 95 after the D/A conversion. Here, before the D/A conversion in the D/A conversion unit 23, signal processing or the like for performing multi-carrier transmission such as OFDM may be performed on the calculated modulated symbols $s_{1p}$ and $s_{2p}$.

Figure 5:
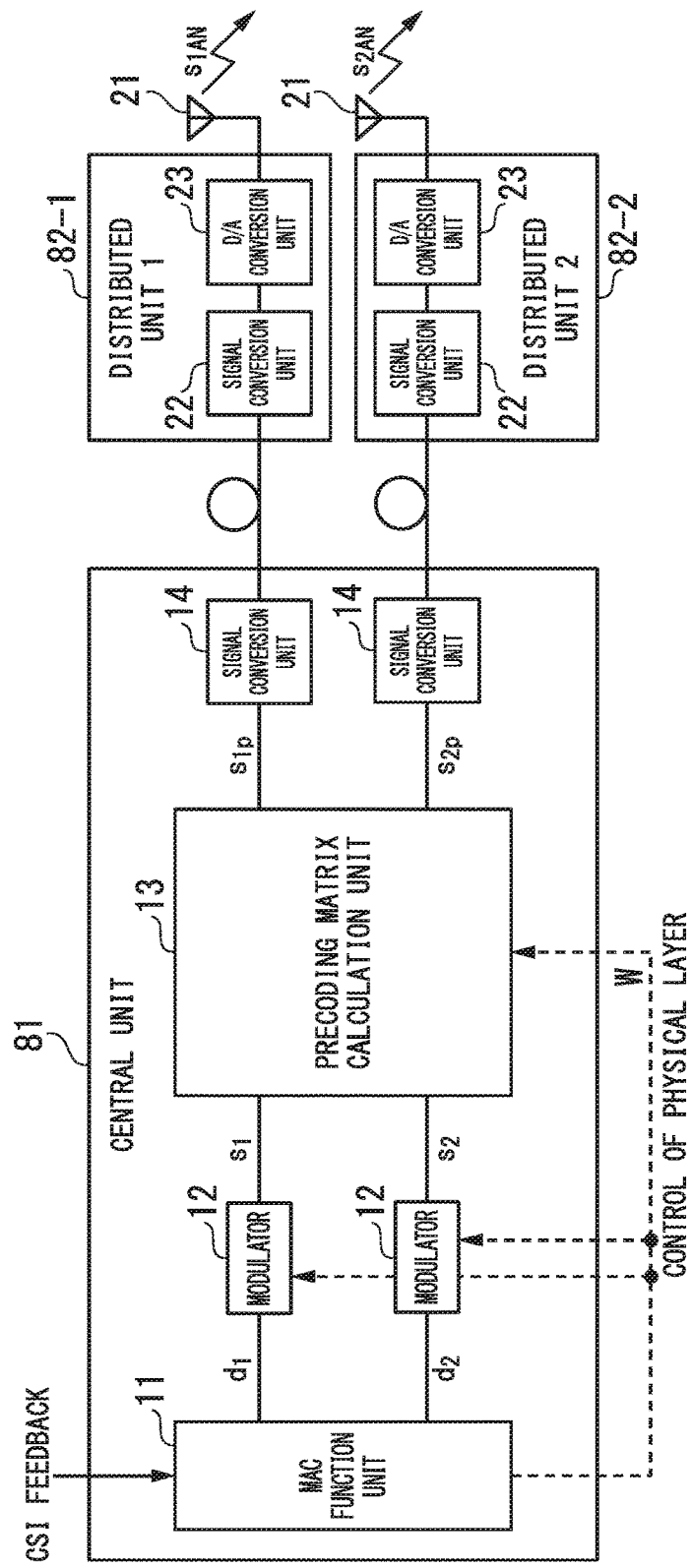
FIG. 5 is a block diagram illustrating an example of signal transmission of CoMP by full centralization in the conventional technology.
Figure 6:
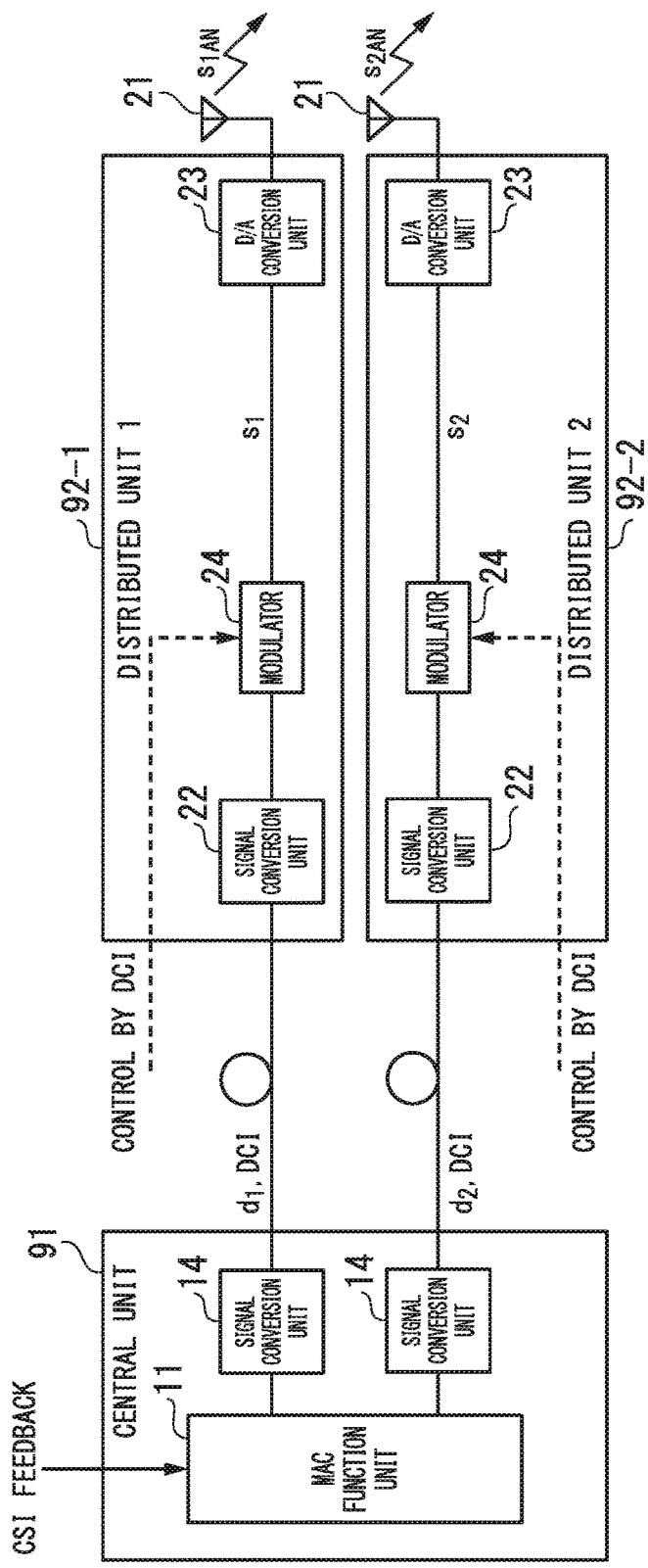
FIG. 6 is a block diagram illustrating an example of signal transmission of CoMP by partial centralization in the conventional technology.

Compared with the signal transmission of CoMP in the full centralization illustrated in FIG. 5, in the configuration of Embodiment 1 illustrated in FIG. 7, a signal to be transmitted between the central unit 191 and the distributed unit 92 is not data of a signal obtained by sampling and quantizing a radio signal but is transport block data. Because an increase in transmission capacity due to the DCI is negligibly small with respect to an effect of reducing the transmission capacity due to this, the transmission capacity between the central unit 191 and the distributed unit 192 is reduced. Even in the signal transmission of CoMP in FIG. 7, it can be seen that analog signals $s_{1AN}$ and $s_{2AN}$ generated from the modulated symbols $s_{1p}$ and $s_{2p}$ subjected to precoding calculation processing are obtained as an output of the antenna 21 of each distributed unit 192 as in FIG. 5. Furthermore, because a necessary transmission capacity for transmitting the precoding matrix W is negligibly smaller than the total transmission capacity, the effect of reducing the transmission capacity does not change.

The same is true for transport blocks following the transport blocks $d_1$ and $d_2$ and modulated symbols corresponding thereto. It is not necessary to transmit all of transport blocks and the DCI addressed to the distributed unit 192-2 to the distributed unit 192-1, and only a transport block and DCI addressed to the distributed unit 192-2 involved in CoMP may be transmitted to the distributed unit 192-1. The reverse is also true.

As described above, by performing signal transmission between the central unit 191 and the distributed units 192 in partial centralization to which Embodiments 1 to 6 of the present invention are applied instead of full centralization, which is currently widely used, it is possible to significantly reduce the transmission capacity and further perform CoMP using coherent JT. Although an increase in the transmission capacity due to transmission of the precoding matrix is negligibly small, it is possible to further suppress an increase of the transmission capacity when a matrix or a vector obtained by dividing the precoding matrix is transmitted in comparison to when the precoding matrix itself is transmitted.

Also, an existing interface may be used in signal conversion used for signal transmission between the central unit 191 and the distributed unit 192 or a unique interface may be used therein. Also, a transport block, DCI, and a precoding matrix may be divided in a time domain, the transport block, the DCI, and the precoding matrix may be transmitted in a packet, and the DCI and the precoding matrix may be incorporated in a header. Also, physical layer processing such as CRC assignment and coding may be performed before after modulation is performed. Before the D/A conversion, signal processing for performing multi-carrier transmission such as OFDM may be performed. Also, passive optical network (PON) technology is applied to the central unit 91 and the distributed unit 92, and data can be efficiently transmitted to each distributed unit using a multicast function of a PON.

Embodiment 2

Figure 8:
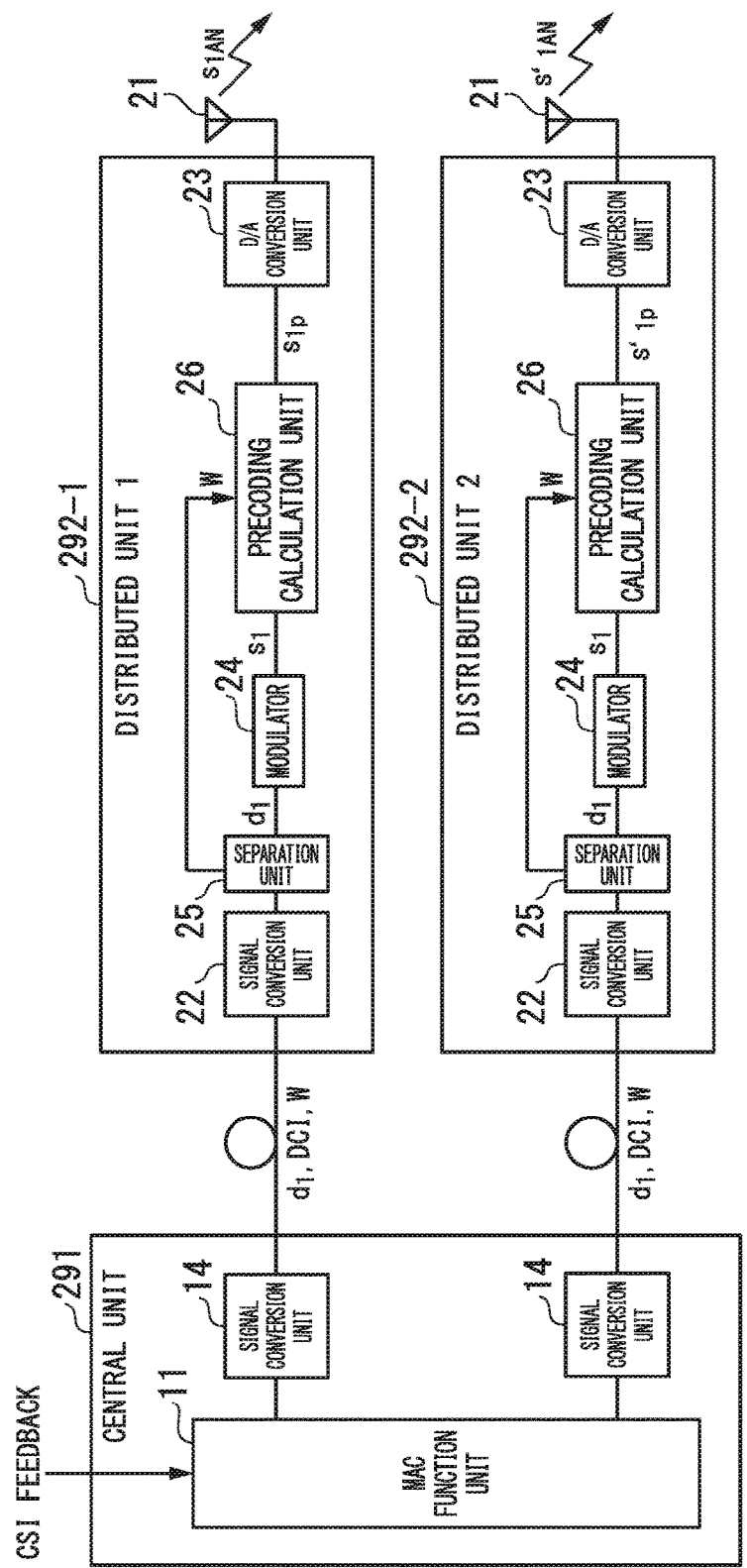
FIG. 8 is a block diagram illustrating a wireless communication system according to Embodiment 2 of the present invention.

FIG. 8 illustrates signal transmission of CoMP in partial centralization to which Embodiment 2 is applied. In a wireless communication system according to the present embodiment, unlike Embodiment 1, the same signal data is transmitted to each distributed unit 292.

First, a signal conversion unit 14 of a central unit 291 transmits a transport block $d_1$ corresponding to a modulated symbol $s_1$ and DCI related to the transport block $d_1$ to distributed units 292-1 and 292-2, and further transmits a precoding vector w represented by the following Equation (3) generated by a MAC function unit 11. The precoding vector w is a necessary matrix for a calculation in which the distributed units 292-1 and 292 generate specific data signals to be transmitted from data signals received from the central unit 291 to a terminal device 95.

$$w = \begin{bmatrix} w_1 \\ w_2 \end{bmatrix} \quad (3)$$

A signal conversion unit 22 included in each of the distributed units 292-1 and 292-2 receives the transport block $d_1$ transmitted by the signal conversion unit 14, the DCI related thereto, and the precoding vector w. A separation unit 25 separates the transport block $d_1$ and the precoding vector w. A modulator 24 modulates the transport block $d_1$ to obtain a modulated symbol $s_1$. Thereafter, a precoding calculation unit 26 performs a precoding matrix calculation represented by the following Equation (4) using the modulated symbol $s_1$ and the precoding vector w. For example, the precoding calculation unit 26 of the distributed unit 292-1 generates $s_{1p}$ from the modulated symbol $s_1$ and $w_1$ and the precoding calculation unit 26 of the distributed unit 292-2 generates $s'_{1p}$ from the modulated symbol $s_1$ and $w_2$.

$$\begin{bmatrix} s_{1p} \\ s'_{1p} \end{bmatrix} = \begin{bmatrix} w_1 \\ w_2 \end{bmatrix} [s_1] = \begin{bmatrix} w_1 s_1 \\ w_2 s_1 \end{bmatrix} \quad (4)$$

Thereafter, D/A conversion units 23 of the distributed units 292-1 and 292-2 perform D/A conversion on $s_{1p}$ and $s'_{1p}$ and transmit D/A conversion results as $s_{1AN}$ and $s'_{1AN}$ from antennas 21. Thereby, it is possible to simultaneously transmit the same data signal to different terminal devices 95.

Also, an existing interface may be used in signal conversion used for signal transmission between the central unit 291 and the distributed unit 292 or a unique interface may be used therein. Also, a transport block, DCI, and a precoding vector may be divided in a time domain, the transport block, the DCI, and the precoding vector may be transmitted in a packet, and the DCI and the precoding vector may be incorporated in a header. Also, physical layer processing such as CRC assignment and coding may be performed before after modulation is performed. Before the D/A conversion, signal processing for performing multi-carrier transmission such as OFDM may be performed. Also, PON technology is applied to the central unit 291 and the distributed unit 292, and data can be efficiently transmitted to each distributed unit 292 using a multicast function of a PON.

Embodiment 3

Figure 9:
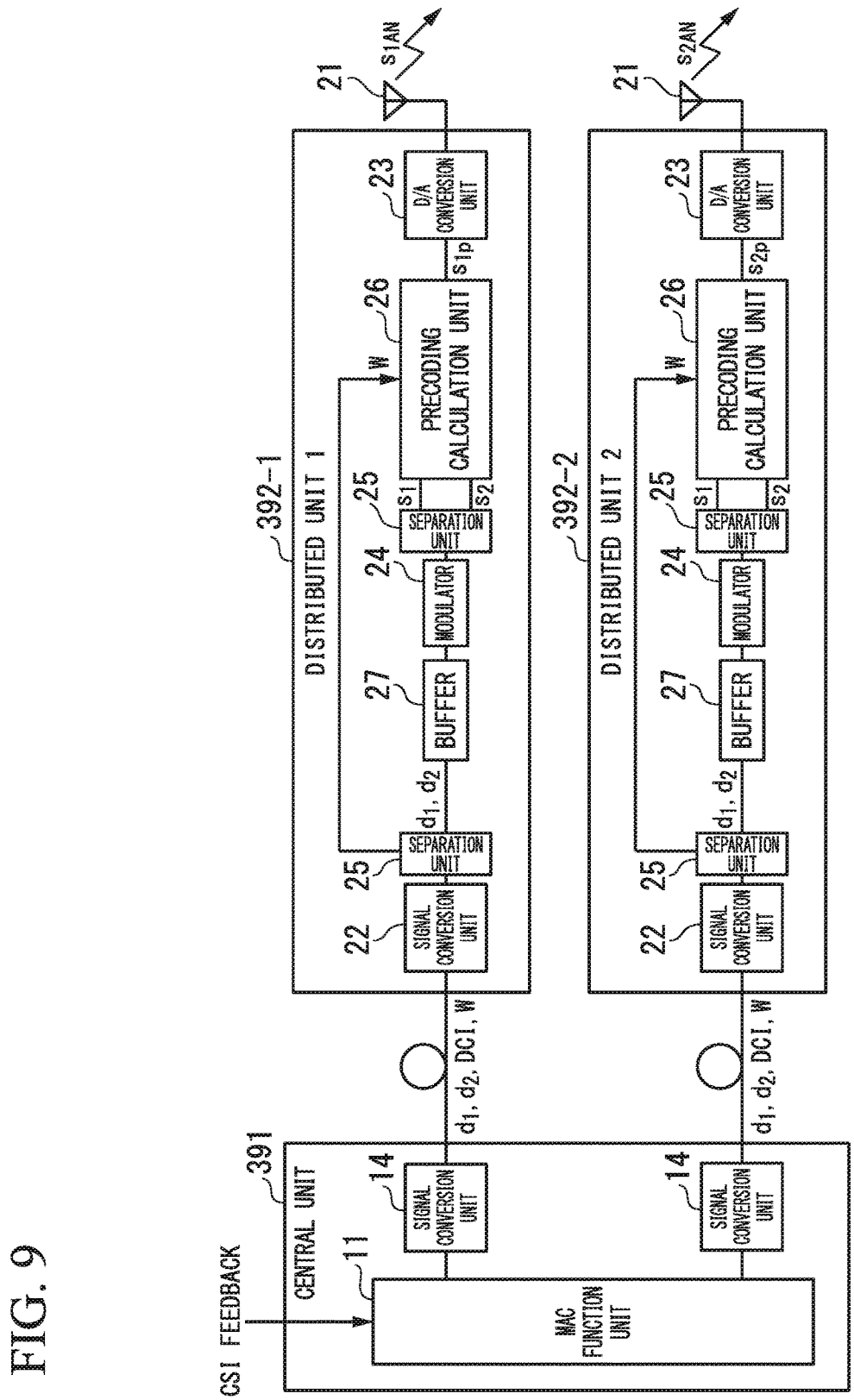
FIG. 9 is a block diagram illustrating a wireless communication system according to Embodiment 3 of the present invention.

FIG. 9 illustrates signal transmission of COMP in partial centralization to which Embodiment 3 is applied. In a wireless communication system according to the present embodiment, unlike Embodiment 1, the number of modulators 24 is reduced using a buffer 27 in each distributed unit 392. The buffer 27 accumulates transport blocks $d_1$ and $d_2$ received by a signal conversion unit 22.

In a reception procedure according to the present embodiment, the transport blocks $d_1$ and $d_2$ received by each of distributed units 392-1 and 392-2 from a central unit 391 and separated with a precoding matrix W by a separation unit 25 are stored in the buffer 27. In a modulation procedure according to the present embodiment, the transport blocks $d_1$ and $d_2$ read from the buffer 27 are sequentially modulated by a modulator 24 to obtain modulated symbols $s_1$ and $s_2$. Thereafter, the separation units 25 separate the modulated symbols $s_1$ and $s_2$, precoding calculation units 26 perform a precoding matrix calculation as in Embodiment 1 and $s_{1AN}$ and $s_{2AN}$ are transmitted from antennas 21 through D/A conversion in D/A conversion units 23. Here, it is unnecessary to limit processing such as coding and the number of modulators 24 to what is illustrated in FIG. 9, and there ma be a plurality of modulators. In that case, the separation unit 25 is also required behind the buffer 27.

Also, an existing interface may be used in signal conversion used for signal transmission between the central unit 391 and the distributed unit 392 or a unique interface may be used therein. Also, a transport block, DCI, and a precoding matrix may be divided in a time domain, the transport block, the DCI, and the precoding matrix may be transmitted in a packet, and the DCI and the precoding matrix may be incorporated in a header. Also, physical layer processing such as CRC assignment and coding may be performed before/after modulation is performed. Before the D/A conversion, signal processing for performing multi-carrier transmission such as OFDM may be performed. Also, PON technology is applied to the central unit 391 and the distributed unit 392, and data can be efficiently transmitted to each distributed unit 392 using a multicast function of a PON.

Embodiment 4

Figure 10:
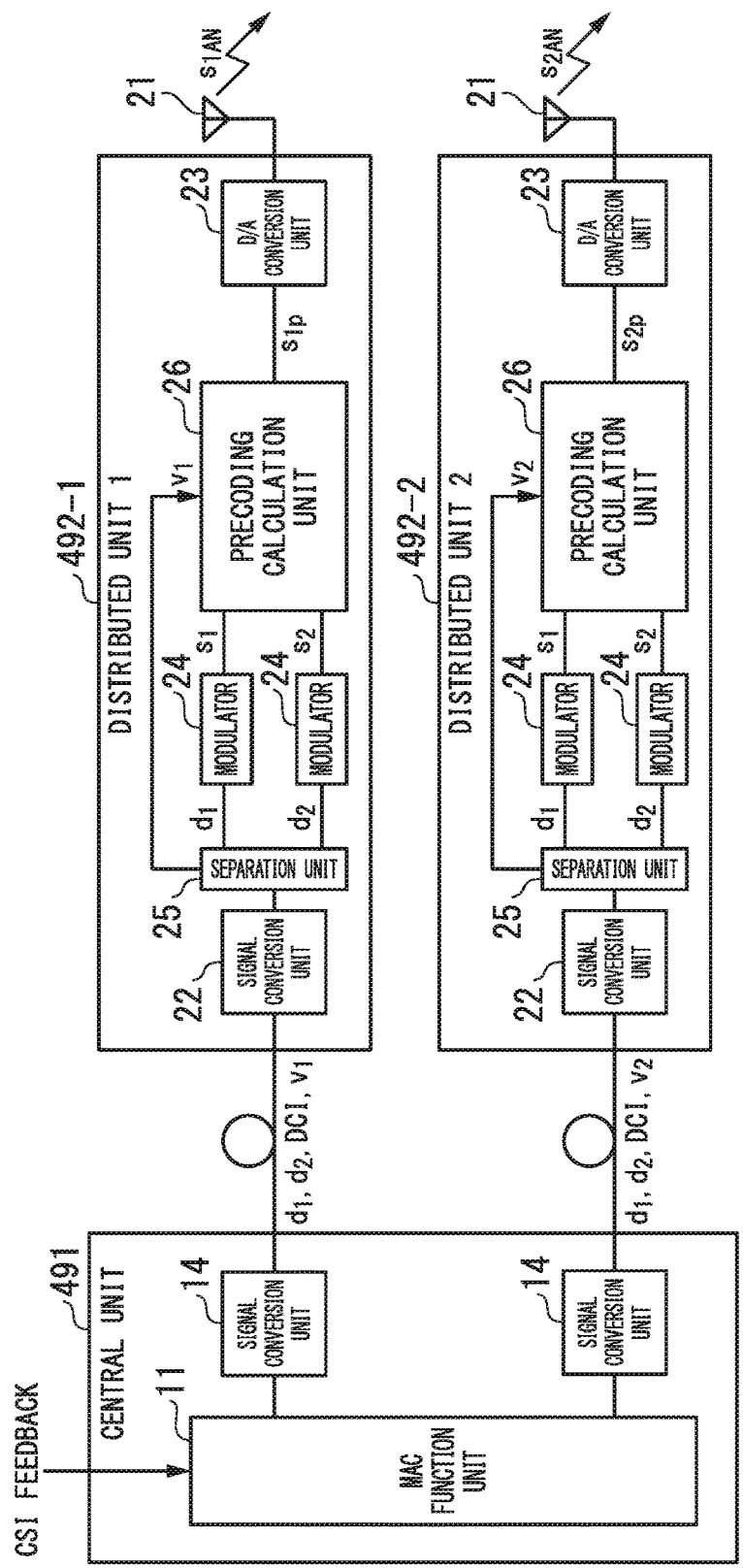
FIG. 10 is a block diagram illustrating a wireless communication system according to Embodiment 4 of the present invention.

FIG. 10 illustrates signal transmission of COMP in partial centralization to which Embodiment 4 is applied. In a wireless communication system according to the present embodiment, unlike Embodiment 1, instead of transmitting a precoding matrix to each distributed unit 492, a partial matrix or a partial vector obtained by dividing the precoding matrix is transmitted so that a necessary element for a matrix calculation in each distributed unit 492 serving as a control target of a central unit 491 is included.

In a central unit transmission procedure according to the present embodiment, a signal conversion unit 14 of the central unit 491 transmits a partial matrix or a partial vector, which is an element of a matrix obtained by dividing a necessary element for a calculation in which modulated symbols $s_{1p}$ and $s_{2p}$, to be transmitted to a mobile terminal device 95 by the distributed unit 492 of a transmission destination are generated for each distributed unit 492 of the transmission destination among necessary elements for a precoding matrix calculation in which the modulated symbols $s_{1p}$ and $s_{2p}$, transmitted to the mobile terminal device 95 by all the distributed units 492 serving as control targets included in the precoding matrix W are generated, to the distributed unit 492 of the transmission destination.

In Embodiment 4, in the central unit transmission procedure, the central unit 491 transmits a vector $v_1$, which is shown in the following Equation (5) and obtained by dividing the precoding matrix W to a distributed unit 492-1 in addition to transport blocks $d_1$ and $d_2$ and DCI, and transmits a vector $v_2$, which is shown in the following Equation (6) and obtained by dividing the precoding matrix W, to a distributed unit 492-2 in addition to the transport blocks $d_1$ and $d_2$ and DCI. The vectors $v_1$ and $v_2$ function as partial matrices or partial vectors which are elements of the matrix obtained by dividing the precoding matrix W. That is, the vectors $v_1$ and $v_2$ are necessary matrices for a calculation in which the distributed units 492-1 and 492-2 generate specific data signals to be transmitted to the terminal device 95 from data signals received from the central unit 491.

$$v_1 = [w_{11} w_{12}] \quad (5)$$

$$v_2 = [w_{21} w_{22}] \quad (6)$$

In the present embodiment, the signal conversion units 22 of the distributed units 492-1 and 492-2 receive the vectors $v_1$ and $v_2$ obtained by dividing a necessary element for a calculation in which modulated symbols $s_{1p}$ and $s_{2p}$ to be transmitted to the mobile terminal device 95 by the distributed units 492-1 and 492-2 receiving the precoding matrix W are generated for each distributed unit 492 receiving the precoding matrix W among necessary elements for a calculation in which the modulated symbols $s_{1p}$ and $s_{2p}$ to be transmitted to the mobile terminal device 95 by all of the distributed units 492-1 and 492-2 serving as the control targets included in the precoding matrix W are generated.

Also, in a calculation procedure according to the present embodiment, the precoding calculation unit 26 of the distributed unit 492-1 obtains the modulated symbols $s_1$ and $s_2$ in each distributed unit 492 as in Embodiment 1, and then calculates a matrix shown in the following Equation (7) using the vector $v_1$ transmitted with the modulated symbols $s_1$ and $s_2$.

$$s_{1p} = v_1 \begin{bmatrix} s_1 \\ s_2 \end{bmatrix} = w_{11}s_1 + w_{12}s_2 \tag{7}$$

Likewise, in the calculation procedure according to the present embodiment, the precoding calculation unit 26 of the distributed unit 492-2 calculates a matrix represented by the following Equation (8) using the modulated symbols $s_1$ and $s_2$ and the transmitted vector $v_2$.

$$s_{2p} = v_2 \begin{bmatrix} s_1 \\ s_2 \end{bmatrix} = w_{21}s_1 + w_{22}s_2 \tag{8}$$

Thereafter, in a distributed unit transmission procedure according to the present embodiment, D/A conversion is performed on each of $s_{1p}$ and $s_{2p}$ in D/A conversion units 23 of the distributed units 492-1 and 492-2, and $s_{1AN}$ and $s_{2AN}$ are transmitted as conversion results from antenna 21. In Embodiment 4, the number of elements of the matrix transmitted between the central unit 491 and each distributed unit 492 can be reduced and the increase in the transmission capacity between the central unit 491 and the distributed unit 492 can be further reduced when compared with Embodiment 1.

Also, an existing interface may be used in signal conversion used for signal transmission between the central unit 491 and the distributed unit 492 or a unique interface may be used therein. Also, a transport block, DCI, and elements of a precoding matrix may be divided in a time domain, the transport block, the DCI, and the elements of the precoding matrix may be transmitted in a packet, and the DCI and the elements of the precoding matrix may be incorporated in a header. Also, physical layer processing such as CRC assignment and coding may be performed before/after modulation is performed. Before the D/A conversion, signal processing for performing multi-carrier transmission such as OFDM may be performed.

Embodiment 5

Figure 11:
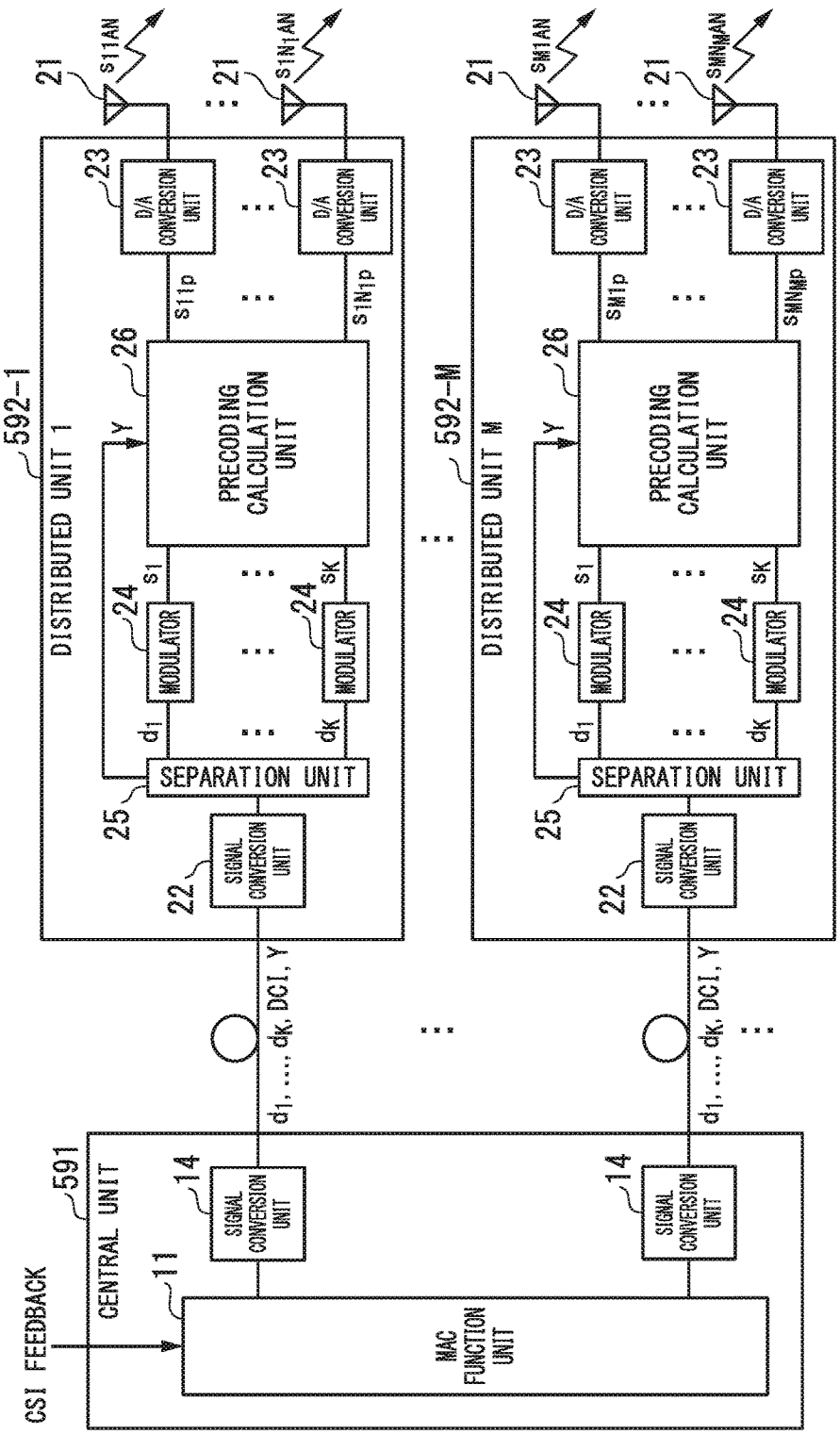
FIG. 11 is a block diagram illustrating a wireless communication system according to Embodiment 5 of the present invention.

FIG. 11 illustrates signal transmission of CoMP in partial centralization to which Embodiment 5 is applied. Unlike Embodiment 1, in Embodiment 5, the number of distributed units 592 is not limited to two and the number of antennas 21 provided in each distributed unit 592 is set to two or more (M). If the number of distributed units 592 is set to one, CoMP cannot be implemented but multiple-input multiple-output (MIMO) transmission using a precoding process can be performed by a distributed unit 592 having a plurality of antennas 21.

Also, even when the number of distributed units 592 is two or more and the number of antennas 21 provided in each of the distributed units 592 is two or more, MIMO transmission using precoding can be performed in each of the distributed units 592. In FIG. 11 it is assumed that the number of cooperating distributed units 592 is L (L is a natural number greater than or equal to one), the number of antennas 21 provided in a distributed unit 592-1 is $N_1$, and the number of antennas 21 provided in a distributed unit 592-M (M=1, . . . , L) is $N_M$. A sum K of the number of antennas 21 provided in all of the distributed units 592 is represented by the following Equation (9).

$$K = \sum_{M=1}^{L} N_M \tag{9}$$

In a central unit transmission procedure according to the present embodiment, a central unit 591 transmits K transport blocks $d_1$ to $d_K$ and DCI corresponding thereto to each distributed unit 592, and further transmits a precoding matrix Y generated in a MAC function unit 11. In this case, a K×K precoding matrix Y is represented by the following Equation (10). The precoding matrix Y is a necessary matrix for a calculation in which the distributed units 592-1 to 592-M generate specific data signals to be transmitted to a terminal device 95 from data signals received from the central unit 591.

$$Y = \begin{bmatrix} y_{11} & \cdots & \cdots & \cdots & \cdots & \cdots & \cdots & y_{1K} \\ \vdots & \ddots & & & & & & \vdots \\ y_{N_1 1} & & \ddots & & & & & y_{N_1 K} \\ \vdots & & & \ddots & & & & \vdots \\ y_{M_1 1} & & & & \ddots & & & y_{M_1 K} \\ \vdots & & & & & \ddots & & \vdots \\ y_{M_{N_M} 1} & & & & & & \ddots & y_{M_{N_M} K} \\ \vdots & & & & & & \ddots & \vdots \\ y_{K1} & \cdots & \cdots & \cdots & \cdots & \cdots & \cdots & y_{KK} \end{bmatrix} \tag{10}$$

Here, subscripts $M_1$ and $M_{N_M}$ respectively indicate first and $N_M^{th}$ antennas of the distributed unit 592-M.

In a reception procedure according to the present embodiment, a signal conversion unit 22 of each distributed unit 592 receives the transport blocks $d_1$ to $d_K$, the DCI corresponding to the transport blocks $d_1$ to $d_K$, and the precoding matrix Y. In the reception procedure, a separation unit 25 of each distributed unit 592 separates the K transport blocks $d_1$ to $d_K$ and the precoding matrix Y.

In a modulation procedure, a modulator 24 modulates each transport block to obtain K modulated symbols $s_1$ to $s_K$. Thereafter, in a calculation procedure, a precoding calculation unit 26 performs matrix calculation using the K modulated symbols $s_1$ to $s_K$ and the precoding matrix Y.

The distributed unit 592-M generates $N_M$ precoded modulated symbols $s_{M1p}$ to $s_{MN_Mp}$ equal in number to the antennas 21 provided in the distributed unit 592-M from an output of a matrix calculation in the precoding calculation unit 26. In a distributed unit transmission procedure, D/A conversion units 23 perform D/A conversion of the precoded modulated symbols $s_{M1p}$ to $s_{MNMp}$, and $N_M$ radio signals $s_{M1AN}$ to $s_{MNMAN}$ are transmitted from the antennas.

For example, the distributed unit 592-1 obtains $N_1$ precoded modulated symbols $s_{11p}$ to $s_{1N1p}$ from an output of the precoding calculation unit 26. Thereafter, the D/A conversion units 23 perform D/A conversion on the precoded modulated symbols and transmit conversion results as $N_1$ radio signals $s_{11AN}$ to $s_{1N1AN}$ from the antennas 21.

Also, any or all of the techniques shown in Embodiments 2, 3 and 4 may be applied to Embodiment 5, and the number of transport blocks may be K or less. For example, if a buffer 27 is used as in Embodiment 3, only one modulator 24 can be provided in each distributed unit 592 to be used to obtain the K modulated symbols $s_1$ to $s_K$.

Also, an existing interface may be used in signal conversion used for signal transmission between the central unit 591 and the distributed unit 592 or a unique interface may be used therein. Also, a transport block, DCI, and a precoding matrix may be divided in a time domain, the transport block, the DCI, and the precoding matrix may be transmitted in a packet, and the DCI and the precoding matrix may be incorporated in a header. Also, physical layer processing such as CRC assignment and coding may be performed before/after modulation is performed. Before the D/A conversion, signal processing for performing multi-carrier transmission such as OFDM may be performed. Also, PON technology is applied to the central unit 591 and the distributed unit 592, and data can be efficiently transmitted to each distributed unit 592 using a multicast function of a PON.

Embodiment 6

Figure 12:
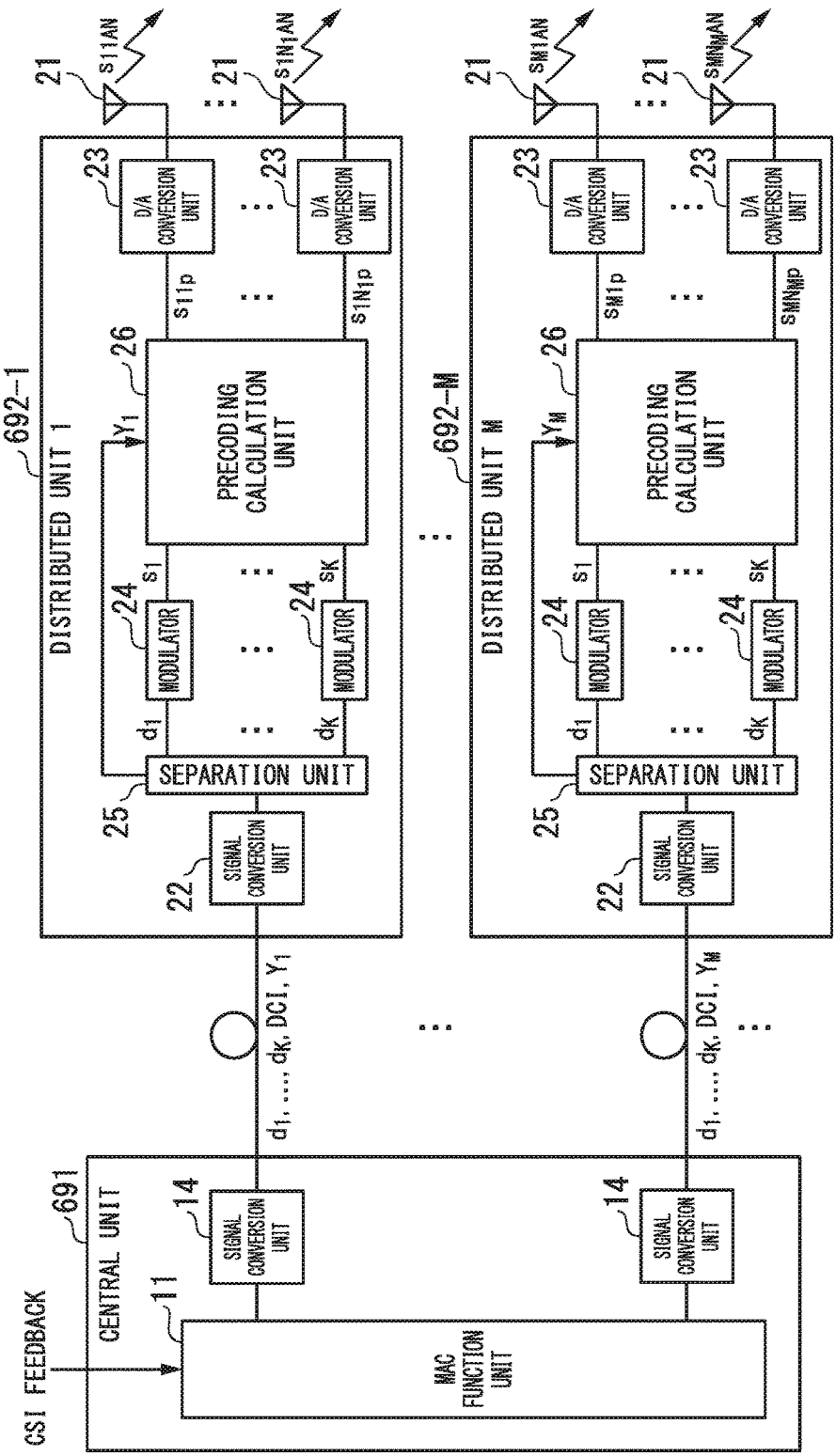
FIG. 12 is a block diagram illustrating a wireless communication system according to Embodiment 6 of the present invention.

FIG. 12 illustrates signal transmission of CoMP in partial centralization to which Embodiment 6 is applied. Reference signs indicating numbers are similar to those of Embodiment 5 and FIG. 11. Unlike Embodiment 1, in Embodiment 6, the number of distributed units 692 is not limited to two, the number of antennas 21 provided in each distributed unit 692 is assumed to be two or more, and a central with 691 transmits a partial matrix or a partial vector obtained by dividing a precoding matrix to each of the distributed units 692 so that a necessary element for a matrix calculation in each distributed unit is included instead of the precoding matrix.

In Embodiment 6, a signal conversion unit 14 of the central unit 691 transmits only an $N_M \times K$ matrix $Y_M$ represented by the following Equation (11) divided from a precoding matrix Y to distributed units 692-1 to 692-M instead of the precoding matrix Y in a central unit transmission procedure. A partial matrix $Y_M$ is a necessary matrix for a calculation in which the distributed units 692-1 to 692-M generate specific data signals to be transmitted to a terminal device 95 from data signals received from the central unit 691.

$$Y_M = \begin{bmatrix} y_{M_1 1} & \cdots & y_{M_1 K} \\ \vdots & \ddots & \vdots \\ y_{M_{N_M} 1} & \cdots & y_{M_{N_M} K} \end{bmatrix} \quad (11)$$

For example, in a calculation procedure, as in Embodiment 5, the distributed unit 692-M calculates a matrix using K modulated symbols obtained through a reception procedure and a modulation procedure and a matrix element $Y_M$ received by each distributed unit 692. In an output of a matrix calculation of a precoding calculation unit 26 of the distributed unit 692-M, precoded modulated symbols $s_{M1p}$ to $s_{MNMp}$ equal in number to the antennas 21 provided in the distributed unit 692-M are obtained. In a distributed unit transmission procedure, the precoded modulated symbols are subjected to D/A conversion by D/A conversion units 23, and $N_M$ radio signals $s_{M1AN}$ to $s_{MNMAN}$ are transmitted from the antennas 21 after the D/A conversion. The processing is similar to those of the other distributed units 692.

Any or all of the techniques shown in Embodiments 2, 3, and 4 may be applied to Embodiment 6, and the number of transport blocks may be K or less. For example, if a buffer 27 is used as in Embodiment 3, only one modulator 24 used to obtain K modulated symbols $s_1$ to $s_K$ can be provided in each distributed unit 692. In Embodiment 6, as compared to Embodiment 5, the number of elements of a matrix transmitted between the central unit 691 and each distributed unit 692 is smaller and an increase in the transmission capacity between the central unit 691 and the distributed unit 692 can be further reduced.

Also, an existing interface may be used in signal conversion used for signal transmission between the central unit 691 and the distributed unit 692 or a unique interface may be used therein. Also a transport block, DCI, and elements of a precoding matrix after division may be divided in a time domain, the transport block, the DCI, and the elements of the precoding matrix after the division max be transmitted in a packet, and the DCI and the elements of the precoding matrix after the division may be incorporated in a header. Also, physical layer processing such as CRC assignment and coding may be performed before/after modulation is performed. Before D/A conversion, signal processing for performing multi-carrier transmission such as OFDM may be performed.

INDUSTRIAL APPLICABILITY

A wireless communication system, central unit equipment, distributed unit equipment, a communication method of central unit equipment, and a communication method of distributed unit equipment of the present invention can be applied to a wireless communication system having a plurality of distributed units having some base station functions including an antenna unit and a central unit that controls the distributed units.

REFERENCE SYMBOLS

11 MAC function unit
12 Modulator
13 Precoding matrix calculation unit
14 Signal conversion unit
21 Antenna
22 Signal conversion unit
23 D/A conversion unit
24 Modulator
25 Separation unit
26 Precoding calculation unit
27 Buffer
91 Central unit
92, 92-1, 92-2 Distributed unit
93 Core network 94 Base station
95 Terminal device

The invention claimed is:

1. Central unit equipment for controlling distributed unit equipment each including antennas for performing wireless communication of a specific data signal with a mobile terminal device, the central unit equipment comprising:
a transmission unit configured to transmit a data signal in which the number of blocks is less than or equal to the total number of antennas provided in all of the distributed unit equipment serving as control targets of the central unit equipment, control information for performing wireless communication of the data signal with the mobile terminal device, and a necessary matrix for a calculation in which the specific data signal to be transmitted to the mobile terminal device is generated from the data signal received from the central unit equipment by the distributed unit equipment, to all the distributed unit equipment serving as the control targets of the central unit equipment.

2. The central unit equipment according to claim 1, wherein the transmission unit transmits a partial matrix or a partial vector, which is obtained by dividing a necessary element for a calculation in which the specific data signal to be transmitted to the mobile terminal device by the distributed unit equipment of a transmission destination is generated for each distributed unit equipment of the transmission destination among necessary elements for a calculation in which the specific data signal to be transmitted to the mobile terminal device by all of the distributed unit equipment serving as control targets included in the necessary matrix is generated, to the distributed unit equipment of the transmission destination.

3. Distributed unit equipment for performing wireless communication of a specific data signal with a mobile terminal device according to control information transmitted from central unit equipment which controls distributed unit equipment each including antennas for performing the wireless communication of the specific data signal with the mobile terminal device, the distributed unit equipment comprising:
a reception unit configured to receive a data signal in which the number of blocks is less than or equal to the total number of antennas provided in all of the distributed unit equipment serving as control targets of the central unit equipment, control information for performing wireless communication of the specific data signal with each mobile terminal device, and a necessary matrix for a calculation in which the specific data signal to be transmitted to the mobile terminal device is generated from the data signal received from the central unit equipment to be performed by the distributed unit equipment, from the central unit equipment;
a modulator configured to modulate each data signal received by the reception unit and generate a modulated symbol of each of the data signals; and
a calculation unit configured to perform a matrix calculation using the modulated symbol and the necessary matrix received by the reception unit and generate the specific data signal to be transmitted to the mobile terminal device.

4. The distributed unit equipment according to claim 3, further comprising:
a buffer configured to accumulate the data signal received by the reception unit,
wherein the modulator sequentially reads data signals accumulated by the buffer from the buffer, modulates the read data signals, and sequentially generates modulated symbols of the data signals.

5. The distributed unit equipment according to claim 3, wherein the reception unit receives a partial matrix or a partial vector, which is obtained by dividing a necessary element for a calculation in which the specific data signal to be transmitted to the mobile terminal device by the distributed unit equipment that receives the necessary matrix is generated for each distributed unit equipment that receives the necessary matrix among necessary elements for a calculation in which the specific data signal to be transmitted to the mobile terminal device by all of the distributed unit equipment serving as control targets included in the necessary matrix is generated; and
wherein the calculation unit performs the matrix calculation using the modulated symbols and the elements of the necessary matrix received from the central unit equipment.

6. A wireless communication system comprising central unit equipment for controlling distributed unit equipment each including antennas for performing wireless communication of a specific data signal with a mobile terminal device, and distributed unit equipment for performing wireless communication of the specific data signal with a mobile terminal device according to control information transmitted from the central unit equipment, wherein:
the central unit equipment comprises:
a transmission unit configured to transmit a data signal in which the number of blocks is less than or equal to the total number of antennas provided in all of the distributed unit equipment serving as control targets of the central unit equipment, control information for performing wireless communication of the specific data signal with the mobile terminal device, and a necessary matrix for a calculation in which the specific data signal to be transmitted to the mobile terminal device is generated from the data signal received from the central unit equipment by the distributed unit equipment, to all the distributed unit equipment serving as the control targets of the central unit equipment; and
the distributed unit equipment comprises:
a reception unit configured to receive the data signal in which the number of blocks is less than or equal to the total number of antennas provided in all of the distributed unit equipment serving as control targets of the central unit equipment, control information for performing wireless communication of the specific data signal with each mobile terminal device, and a necessary matrix for a calculation in which the specific data signal to be transmitted to the mobile terminal device is generated from the data signal received from the central unit equipment to be performed by the distributed unit equipment, from the central unit equipment;
a modulator configured to modulate each data signal received by the reception unit and generate a modulated symbol of each of the data signals; and
a calculation unit configured to perform a matrix calculation using the modulated symbol and the necessary matrix received by the reception unit and generate the specific data signal to be transmitted to the mobile terminal device.

7. A communication method of central unit equipment for controlling distributed unit equipment each including antennas for performing wireless communication of a specific data signal with a mobile terminal device, the communication method comprising:

a central unit transmission procedure of transmitting a data signal in which the number of blocks is less than or equal to the total number of antennas provided in all of the distributed unit equipment serving as control targets of the central unit equipment, control information for performing wireless communication of the specific data signal with each mobile terminal device, and a necessary matrix for a calculation in which the specific data signal to be transmitted to the mobile terminal device is generated from the data signal received from the central unit equipment by the distributed unit equipment, to all of the distributed unit equipment serving as the control targets of the central unit equipment.

8. The communication method of the central unit equipment according to claim 7, wherein a partial matrix or a partial vector, which is obtained by dividing a necessary element for a calculation in which the specific data signal to be transmitted to the mobile terminal device by the distributed unit equipment of a transmission destination is generated for each distributed unit equipment of the transmission destination among necessary elements for a calculation in which the specific data signal to be transmitted to the mobile terminal device by all of the distributed unit equipment serving as control targets included in the necessary matrix is generated, is transmitted to the distributed unit equipment of the transmission destination in the central unit transmission procedure.

9. A communication method of distributed unit equipment for performing wireless communication of a specific data signal with a mobile terminal device according to control information transmitted from central unit equipment which controls distributed unit equipment each including antennas for performing the wireless communication of the specific data signal with the mobile terminal device, the communication method comprising:
   a reception procedure of receiving a data signal in which the number of blocks is less than or equal to the total number of antennas provided in all of the distributed unit equipment serving as control targets of the central unit equipment, control information for performing wireless communication of the specific data signal with each mobile terminal device, and a necessary matrix for a calculation in which the specific data signal to be transmitted to the mobile terminal device is generated from the data signal received from the central unit equipment to be performed by the distributed unit equipment, from the central unit equipment;
   a modulation procedure of modulating each data signal received from the central unit equipment and generating a modulated symbol of each of the data signals;
   a calculation procedure of performing a matrix calculation using the modulated symbol and the necessary matrix received from the central unit equipment and generating a specific data signal after the calculation; and
   a distributed unit transmission procedure of transmitting the specific data signal extracted in the calculation procedure to the mobile terminal device.

10. The communication method of the distributed unit equipment according to claim 9,
   wherein the data signal received from the central unit equipment is accumulated in a buffer in the reception procedure, and
   wherein, in the modulation procedure, data signals accumulated in the buffer are sequentially read from the buffer and modulated, and modulated symbols of the data signals are sequentially generated.

11. The communication method of the distributed unit equipment according to claim 9,
   wherein a reception unit receives a partial matrix or a partial vector, which is obtained by dividing a necessary element for a calculation in which the specific data signal to be transmitted to the mobile terminal device by the distributed unit equipment that receives the necessary matrix is generated for each distributed unit equipment that receives the matrix among necessary elements for a calculation in which the specific data signal to be transmitted to the mobile terminal device by all of the distributed unit equipment serving as control targets included in the necessary matrix is generated, in the reception procedure, and
   wherein the matrix calculation is performed using the modulated symbols and the elements of the necessary matrix received from the central unit equipment in the calculation procedure.

* * * * *